United States Patent
Goertzen

(10) Patent No.: US 6,900,821 B2
(45) Date of Patent: May 31, 2005

(54) SYSTEM AND METHOD FOR OPTIMIZING IMAGE RESOLUTION USING PIXELATED IMAGING DEVICE

(75) Inventor: Kenbe D. Goertzen, Topeka, KS (US)

(73) Assignee: QuVIS, Inc., Topeka, KS (US)

( * ) Notice: Subject to any disclaimer, the term of this patent is extended or adjusted under 35 U.S.C. 154(b) by 0 days.

(21) Appl. No.: 10/228,627

(22) Filed: Aug. 26, 2002

(65) Prior Publication Data

US 2003/0071826 A1 Apr. 17, 2003

Related U.S. Application Data

(63) Continuation of application No. 09/775,884, filed on Feb. 2, 2001, now abandoned.
(60) Provisional application No. 60/179,762, filed on Feb. 2, 2000.

(51) Int. Cl.$^7$ .............................................. G09G 5/02
(52) U.S. Cl. ....................... 345/698; 345/606; 345/615; 345/643; 382/260
(58) Field of Search ................................. 345/418, 586, 345/606–610, 612–613, 615, 643, 691–698, 620; 382/254, 260, 261–265, 279; 348/262, 263, 264, 265, 268–270

(56) References Cited

U.S. PATENT DOCUMENTS

| | | | | |
|---|---|---|---|---|
| 4,652,909 A | * | 3/1987 | Glenn | 348/262 |
| 4,676,250 A | * | 6/1987 | Barnes | 600/442 |
| 5,181,251 A | * | 1/1993 | Schultheiss et al. | 381/96 |
| 5,815,580 A | * | 9/1998 | Craven et al. | 381/58 |
| 5,963,273 A | * | 10/1999 | Boie et al. | 348/725 |
| 6,157,396 A | * | 12/2000 | Margulis et al. | 345/506 |
| 6,163,348 A | * | 12/2000 | Izumi et al. | 348/761 |
| 6,213,956 B1 | * | 4/2001 | Lawton | 600/558 |
| 6,340,994 B1 | * | 1/2002 | Margulis et al. | 348/625 |
| 6,342,810 B1 | * | 1/2002 | Wright et al. | 330/51 |

* cited by examiner

Primary Examiner—Matthew C. Bella
Assistant Examiner—Wesner Sajous
(74) Attorney, Agent, or Firm—Bromberg & Sunstein LLP

(57) ABSTRACT

A method of processing image data for display on a pixelated imaging device is disclosed. The method comprises: pre-compensation filtering an image input to produce pre-compensation filtered pixel values, the pre-compensation filter having a transfer function that approximates the function that equals one divided by a pixel transfer function; and displaying the pre-compensation filtered pixel values on the pixelated imaging device.

In another disclosed method, the method further comprises: pre-compensation filtering an image input for each of a plurality of superposed pixelated imaging devices, at least two of which are unaligned, to produce multiple sets of pre-compensation filtered pixel values; and displaying the multiple pre-compensation filtered pixel values on the plurality of superposed pixelated imaging devices.

18 Claims, 8 Drawing Sheets

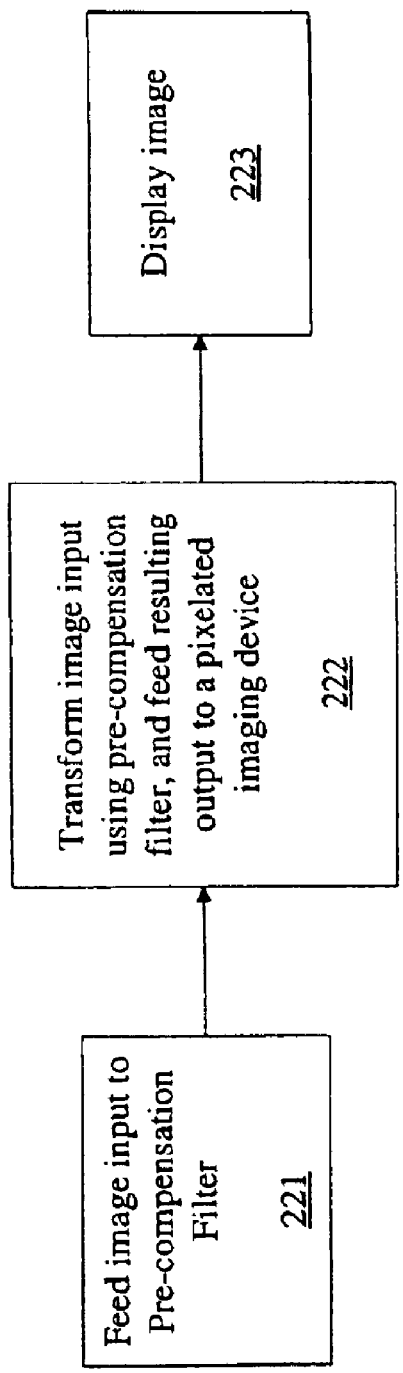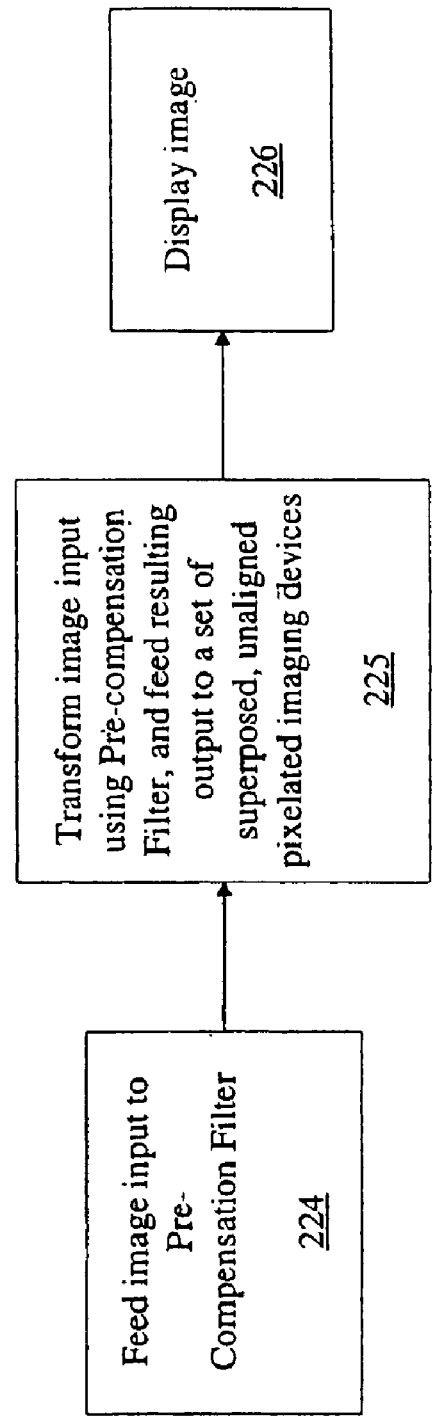

SYSTEM AND METHOD FOR OPTIMIZING IMAGE RESOLUTION USING PIXELATED IMAGING DEVICE

CROSS-REFERENCE TO RELATED APPLICATIONS

This application is a continuation of our application Ser. No. 09/775,884, filed Feb. 2, 2001 now abandoned, and claims the benefit of our provisional application Ser. No. 60/179,762, filed Feb. 2, 2000. The disclosure of both of these related applications is hereby incorporated herein by reference.

FIELD OF THE INVENTION

The invention generally relates to systems and methods for optimizing the resolution of graphical displays, and more particularly the invention relates to systems and methods for optimizing the resolution of pixelated displays.

BACKGROUND OF THE INVENTION

Graphical display engineers continue to minimize pixel hardware size. However, for any given minimum pixel size, there is an ongoing need to optimize display resolution.

SUMMARY OF THE INVENTION

In one embodiment of the invention, a method of processing image data for display on a pixelated imaging device comprises: pre-compensation filtering an image input to produce pre-compensation filtered pixel values, the pre-compensation filter having a transfer function that approximates the function that equals one divided by a pixel transfer function; and displaying the pre-compensation filtered pixel values on the pixelated imaging device.

In another embodiment of the invention, a method further comprises: pre-compensation filtering an image input for each of a plurality of superposed pixelated imaging devices, at least two of which are unaligned, to produce multiple sets of pre-compensation filtered pixel values; and displaying the multiple pre-compensation filtered pixel values on the plurality of superposed pixelated imaging devices.

In a further embodiment of the invention, a method further comprises: displaying the multiple pre-compensation filtered pixel values on six imagers, the six imagers being positioned into four phase families, the first and third phase families corresponding to separate green imagers, the second and fourth phase families corresponding to separate sets of aligned blue and red imagers.

Further related system and method embodiments are also disclosed.

BRIEF DESCRIPTION OF THE DRAWINGS

The foregoing description of various embodiments of the invention should be appreciated more fully from the following further description thereof with reference to the accompanying drawings wherein:

FIGS. 2A and 2B show schematic block diagrams of methods of processing image signals to optimize image resolution, in accordance with two different embodiments of the invention;

DESCRIPTION OF ILLUSTRATIVE EMBODIMENTS

Figure 1:
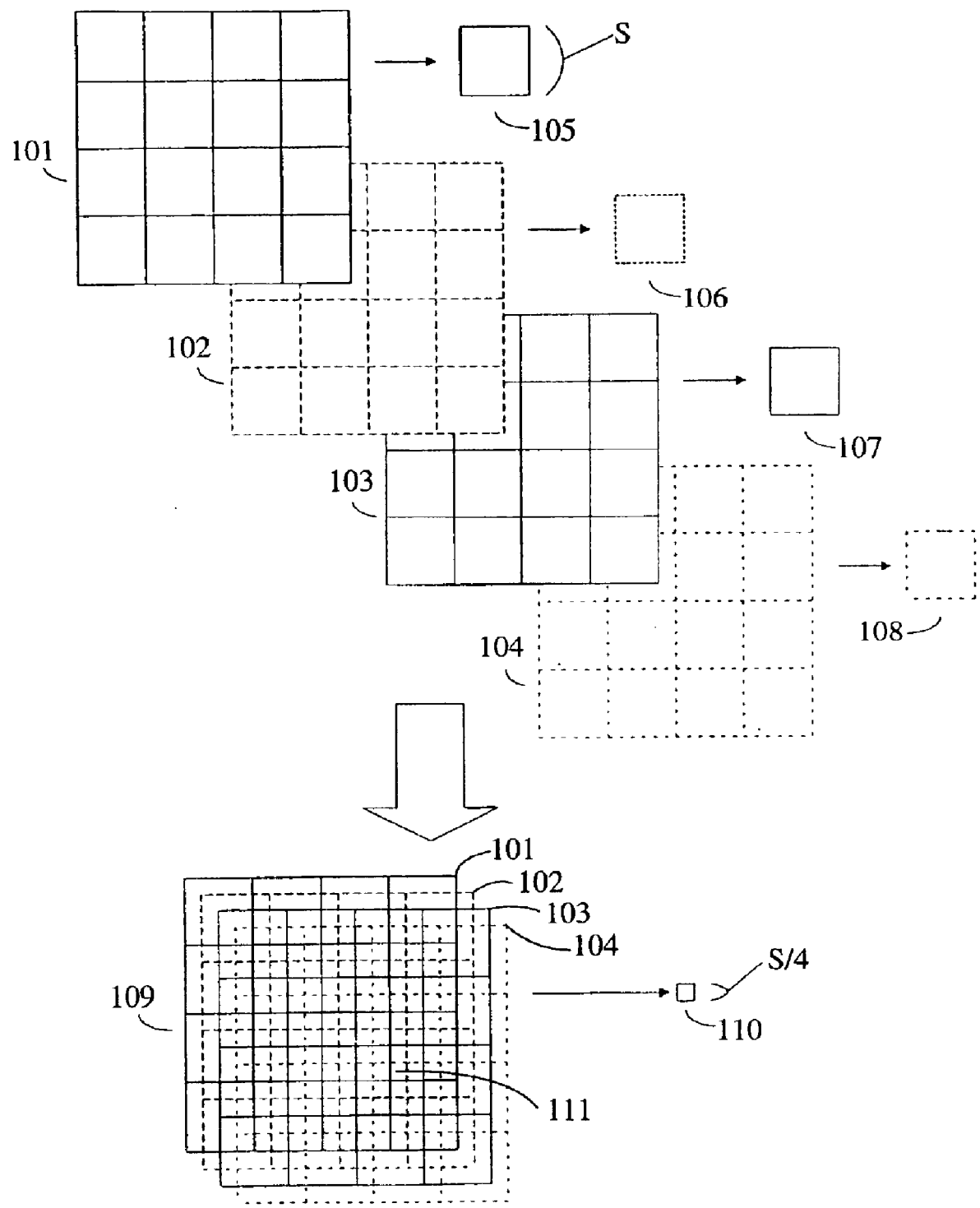
FIG. 1 shows an imager arrangement for optimizing display resolution in accordance with an embodiment of the invention.

FIG. 1 shows an imager arrangement for optimizing display resolution in accordance with an embodiment of the invention. Each of pixelated imaging devices 101–104 includes pixel hardware that forms an array of regular polygons, tiling a planar area. To optimize display resolution, multiple pixelated imaging devices 101–104 are superposed in an unaligned fashion, to form a combined display device 109. Each successive imaging device of the four superposed imaging devices 101–104 is offset by one-quarter of the pixel dimension S, in both the vertical and horizontal directions.

Individual pixel-like features 111 of the resulting combined display device 109 have a minimum dimension, S/4, that is one-quarter the minimum dimension, S, of the actual pixels of each separate imaging device 101–104. The pixel-like features 111 of the combined display device 109 thus have a square area that is one-sixteenth that of the actual pixels of each separate imaging device 101–104. The size reduction may be seen in FIG. 1 by comparing the size of individual pixel-like feature 110 of the combined display device 109, with the size of individual pixels 105–108 of the separate pixelated imaging devices 101–104.

The unaligned superposition of FIG. 1 thus allows increased display resolution for a given minimum pixel dimension S, which may, for example, be the smallest pixel dimension that is presently capable of being implemented in hardware for a single separate display.

In FIG. 1, the polygons of imaging devices 101–104 are square, but they may also be rectangular, or any other shape, in accordance with an embodiment of the invention. While four pixelated imaging devices are shown in FIG. 1, any number may be used. In addition, the lack of alignment of the separate imaging devices may be produced by a variety of different methods, in accordance with other embodiments of the invention. For example, pixelated imaging devices with square or rectangular pixels may be spatially shifted by a different amount in the horizontal direction than in the vertical direction. Two or more imaging devices may be aligned with each other, with no spatial shift, while others are unaligned with each other, in the same display. A lack of alignment may also be produced by an optical or physical change between the separate imaging devices; or by changing the separate imaging devices' scale, rotational angle, aspect ratio, or liner offset with respect to each other. In another embodiment, a time-multiplexed imager may be used to produce the same effect as is produced by superposing multiple separate imaging devices: the imager or optics of the time-multiplexing imager moves to a different position when transmitting a signal that corresponds to each of the separate imaging devices.

The below chart shows a comparison of three displays: in the "Aligned" array, three pixelated imagers are fully aligned, with no offset as shown in FIG. 1. In the "½ offset" array, three imagers are used, one having green color information, and the other two having blue and red information; the blue and red arrays are aligned with each other, but both diagonally offset by ½ of the pixel diagonal spacing from the green imager. In the "¼ offset" array, six imagers are used, two for red information, two for green, and two for blue, as will be further described below in connection with FIG. 9. The comparison shows the increase in effective resolution, and decrease in imager visibility, that results from unaligning superposed imagers, as in the embodiment of FIG. 1:

|  | Aligned | ½ offset | ¼ offset |
| --- | --- | --- | --- |
| Array Size | 1280 × 1024 × 3 | 1280 × 1024 × 3 | 1280 × 1024 × 6 |
| Hor. Addressable | 1280 | 1280 × 2 | 1280 × 4 |
| Vert. Addressable | 1024 | 1024 × 2 | 1024 × 4 |
| Effective Resolution | 1280 × 1024 | 1800 × 1400 | 2560 × 2048 |
| Imager visibility | 1 | ½ | ¼ |

In the above table, "Imager Visibility" is used to refer to the relative visibility of the imager as compared with the image when viewing the image of a close distance. As can be seen, unaligned imagers reduce the imager visibility, which is caused by the imagers' finite resolution and inter-pixel gaps; in general the reduction of imager visibility is proportional to the number of offsets used.

FIGS. 2A and 2B show scematic block diagrams of methods of processing image signals to optimize image resolution, in accordance with two different embodiments of the invention. In a pixelated grid display, frequency response tapers off to zero at the Nyquist frequency of the 2D box filter implemented by the filter. This response varies according to radial frequency direction, and phase relationship to the pixel grid. To improve the image quality achieved by such a pixelated display, an embodiment according to the invention oversamples an image relative to the display, and generates pixel values by using a two- or three-dimensional pre-compensation filter. The filter combines radial bandlimiting, to avoid aliasing, with pre-compensation for the imperfect and directional frequency response function of the display.

In step 221 of FIG. 2A, an image input is fed to a pre-compensation filter. The image input may be in any of a variety of formats, including, for example, HDTV, NTSC, PAL etc. In step 222 of FIG. 2A, the pre-compensation filter transforms the image input and feeds the resulting output directly to a pixelated imaging device, where an image is displayed in step 223. In the embodiment of FIG. 2A, the pixelated imaging device may be a conventional display, so that the pre-compensation filter improves the sharpness and resolution of a conventional display in a fashion described further below.

By contrast, in step 225 of the embodiment of FIG. 2B, the pre-compensation filter transforms the image input into a set of pre-compensated image signals, and feeds each pre-compensated signal to a different imaging device of a combined set of superposed, unaligned pixelated imaging devices. For example, the pre-compensation filter may feed a separate pre-compensated output signal to each of the imaging devices 101–104 that form the combined pixelated imaging device 109 of the embodiment of FIG. 1. In step 226 of FIG. 2B, a resulting image is displayed on the combined set of superposed, unaligned pixelated imaging devices.

Figure 3A:
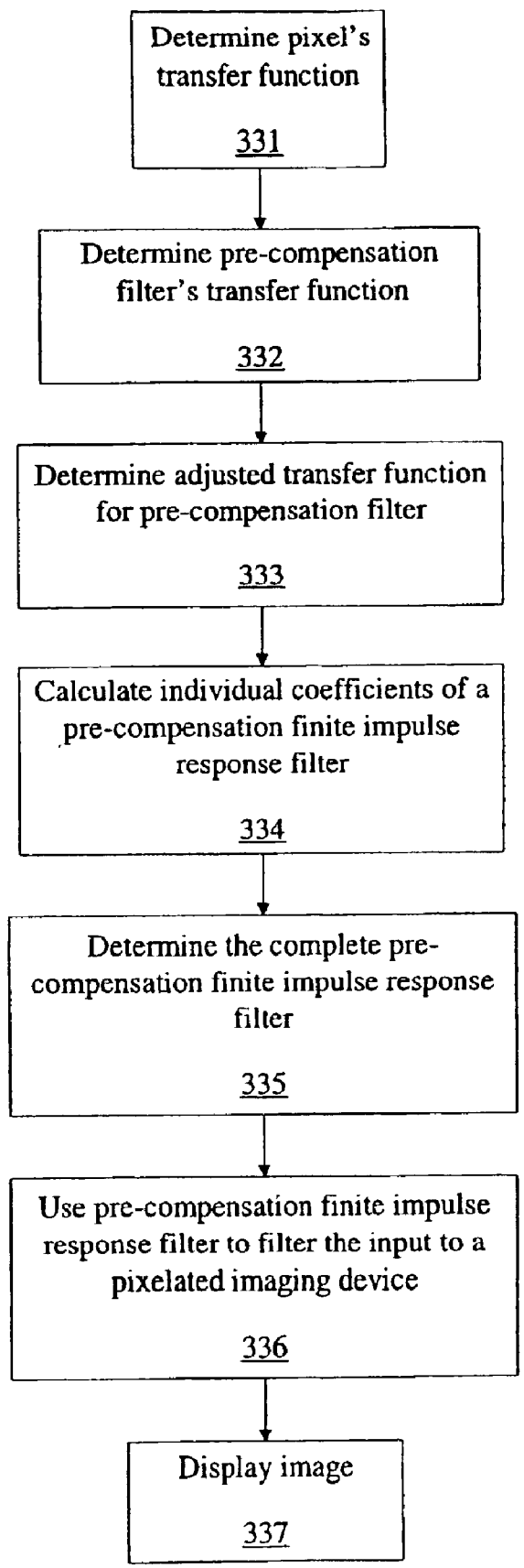
FIGS. 3A and 3B detail implementation of pre-compensation filters in accordance with two different embodiments of the invention.
Figure 3B:
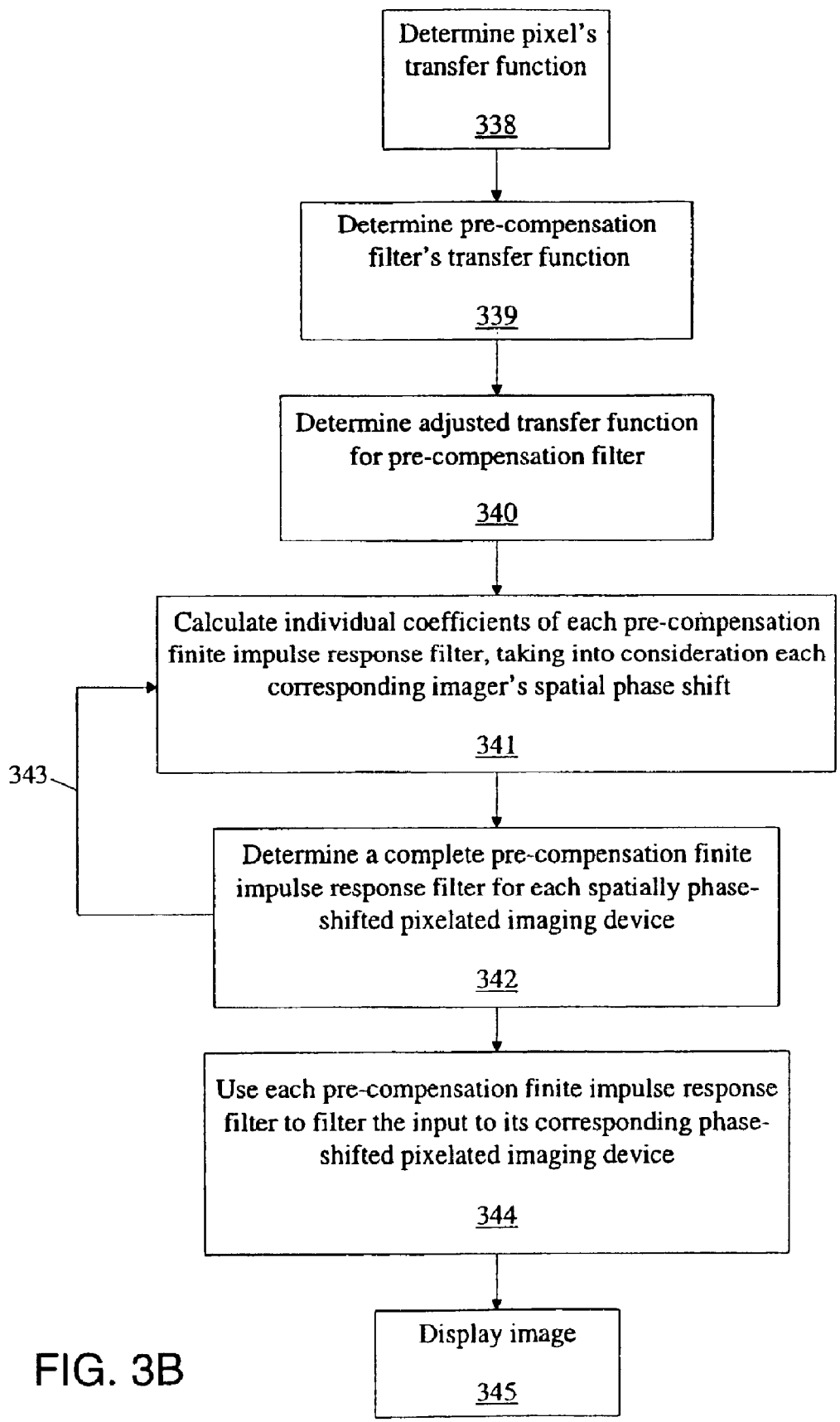

FIGS. 3A and 3B further detail implementation of pre-compensation filters in accordance with two different embodiments of the invention. The filters may be used, for example, as pre-compensation filters in the embodiments of FIGS. 2A and 2B, respectively.

In step 331 of FIG. 3A, the transfer function of an individual pixel is determined. This may be performed by determining the Fourier Transform (or other frequency-domain representation) of the pixel's impulse response.

Figure 4:
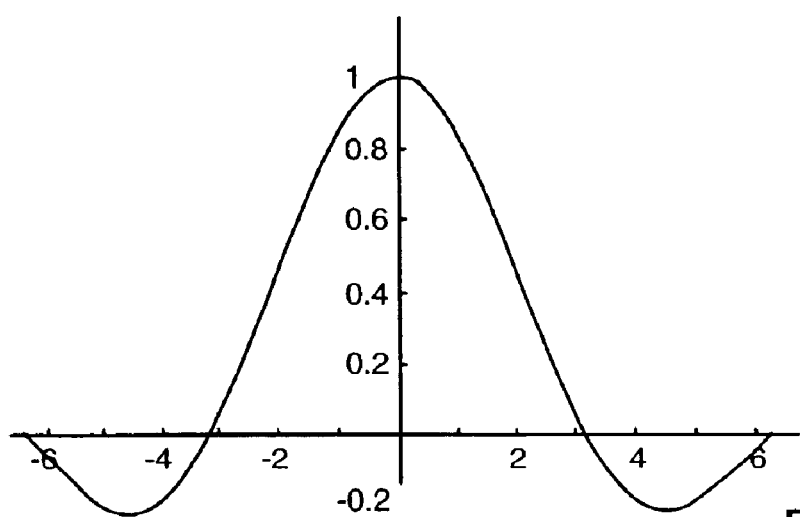
FIG. 4 shows a one-dimensional pixel transfer function.

For example, a pixel could be modeled in one dimension as having a "boxcar" impulse response, equal to 1 at the pixel's spatial location and 0 elsewhere. A transfer function for such a pixel is given by:

$$H[x] = \operatorname{Sinc}[x] = \begin{cases} 1, & x = 0 \\ \dfrac{\sin[x]}{x}, & x \neq 0 \end{cases} \quad \{\text{Eq. 1}\}$$

for spatial frequency x. This transfer function is shown in the graph of FIG. 4, with frequency x on the x-axis in radians, and the pixel's transfer function on the y-axis.

Analogously, a pixel could be modeled in two dimensions as a square finite impulse response filter with unity coefficients inside the pixel's spatial location and zero coefficients elsewhere. A transfer function for such a pixel is given by:

$$H[u,V] = \operatorname{Sinc}[u] * \operatorname{Sinc}[V] \quad \{\text{Eq. 2}\}$$

with Sin c as defined for Equation 1, and "*" denoting convolution.

Next, in step 332 of FIG. 3A, the pixel's transfer function is used to determine a transfer function for the pre-compensation filter. In one embodiment according to the invention, the pre-compensation filter is chosen such that its transfer function satisfies the expression:

$$\{\text{Pre-compensation filter transfer function}\} = \{1/\text{pixel transfer function}\} \quad \{\text{Eq. 3}\}$$

although other relations that give similar results will be apparent to those of ordinary skill in the art.

Next, in step 333 of FIG. 3A, an adjusted transfer function for the pre-compensation filter is determined. This step may involve, for example, gain-limiting the pre-compensation filter's transfer function; or clipping off its values at aliasing frequencies. For example, using the one-dimensional example above, an example of a gain-limited and clipped pre-compensation filter transfer function is given by:

$$H_G[x] = \begin{cases} 0, & \operatorname{Abs}[x] > \pi; \\ \operatorname{Sign}[\operatorname{Sinc}[x]](G - ((G/2)\wedge 2)\operatorname{Abs}[\operatorname{Sinc}[x]]), \\ \quad \operatorname{Abs}[\operatorname{Sinc}[x]] < 2/G; \\ 1/\operatorname{Sinc}[x], & \text{otherwise} \end{cases} \quad \{\text{Eq. 4}\}$$

with G being a gain factor that could be set, for example, to equal 4.

Using the analogous two-dimensional example given above, an example of a two-dimensional gain-limited and clipped pre-compensation filter transfer function is given by:

$$H_G[u, V] = \begin{cases} 0, \text{Abs}[u] > \pi; \\ 0, \text{Abs}[V] > \pi; \\ \textit{Sign}[\text{Sinc}[u] * \text{Sinc}[v]](G - ((G/2)^{\wedge}2)\text{Abs}[\text{Sinc}[u] * \text{Sinc}[V]]), \\ \quad \quad \text{for\_Abs}[\text{Sinc}[u] * \text{Sinc}[V]] < 2/G; \\ 1/(\text{Sinc}[u] * \text{Sinc}[V]), \text{otherwise} \end{cases} \quad \text{\{Eq. 5\}}$$

with G being a gain factor that could be set, for example, to equal 4.

Next, in step 334 of FIG. 3A, the adjusted transfer function of the pre-compensation filter calculated in step 333 is used to calculate individual coefficients of a pre-compensation finite impulse response filter. This is performed by a transform back into the spatial domain (out of the frequency domain), using, for example, an inverse Fourier transform. In the two-dimensional example given above, an individual pre-compensation filter coefficient can be calculated by the expression:

$$C[m, n] = \frac{1}{\pi^{\wedge}2} \int_0^\pi \int_0^\pi H_G[u, V] \cos[mu] \cos[nV] du dV \quad \text{\{Eq. 6\}}$$

Next, in step 335 of FIG. 3A, the entire pre-compensation finite impulse response filter is determined, by combining individual coefficients as calculated in step 334 into a single array formed from coefficients that correspond to each pixel location in the display. Thus, for example, Equation 6 could be used to calculate a coefficient for each pair (m,n) of a coordinate system covering a two-dimensional pixelated imaging device.

Next, in step 336 of FIG. 3A, the pre-compensation finite impulse response filter determined in step 335 is used to transform image input data; and, in step 337, the resulting filtered image is displayed.

Figure 6:
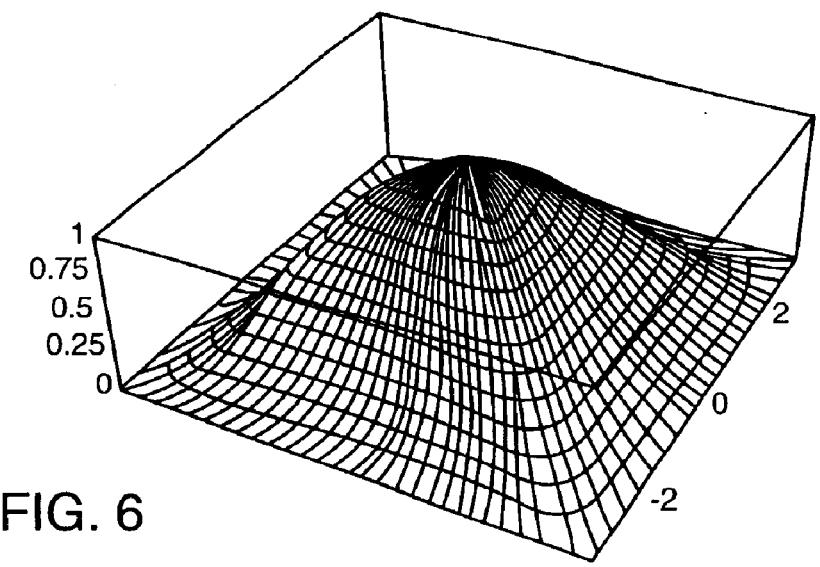
FIG. 6 shows a two-dimensional pixel transfer function.
Figure 7:
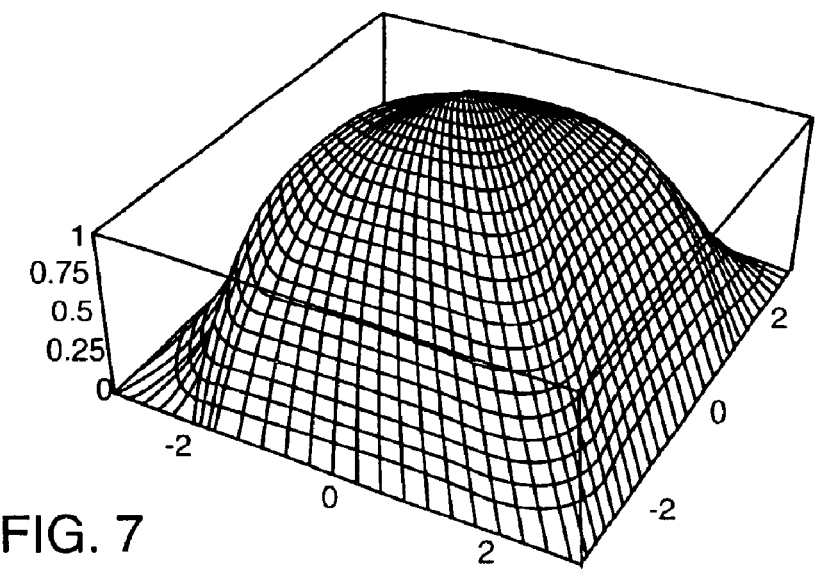
FIG. 7 shows a two-dimensional pre-compensated pixel transfer function, determined in accordance with an embodiment of the invention.
Figure 5:
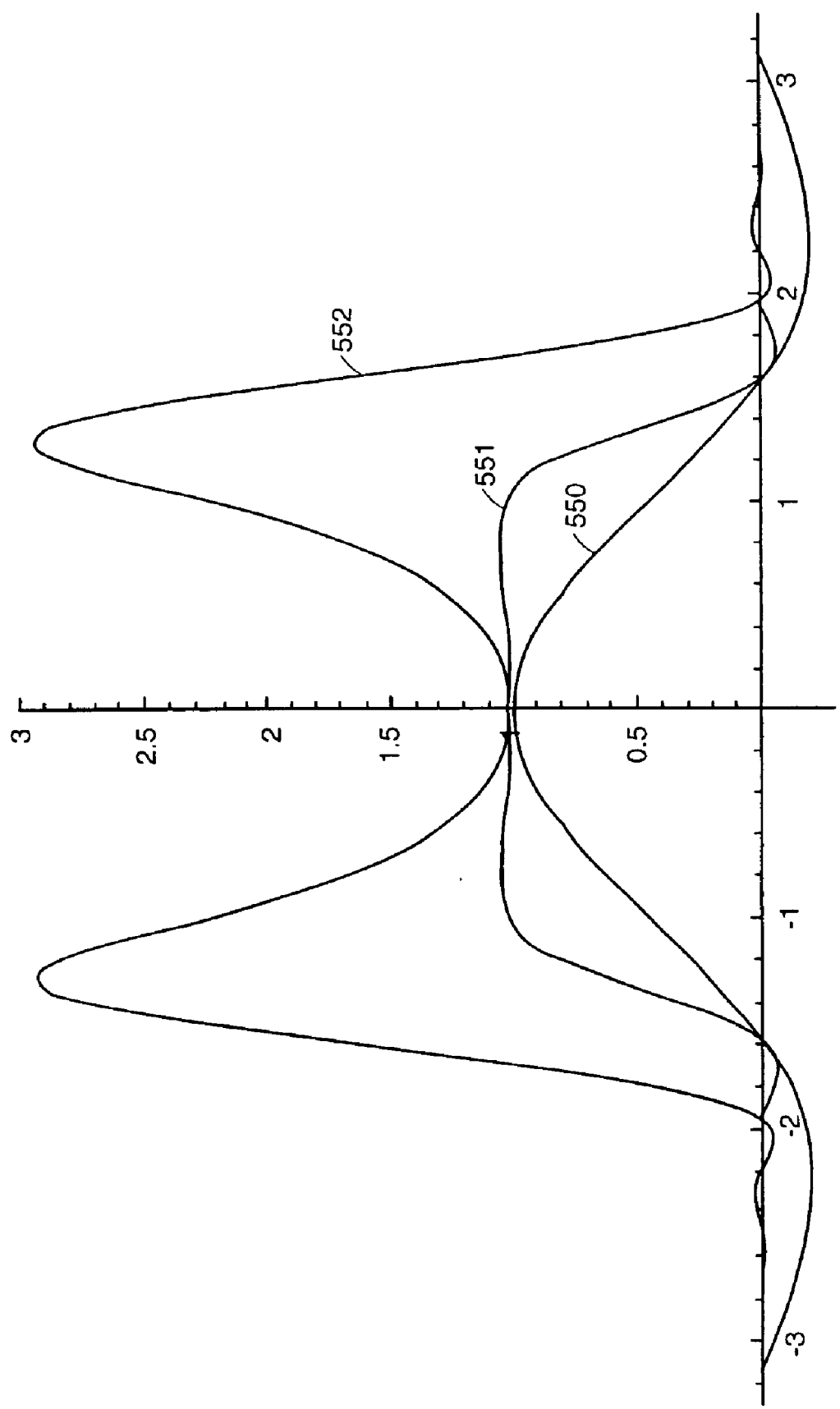
FIG. 5 shows a set of transfer functions, determined in accordance with an embodiment of the invention.

In this fashion a pre-compensation filter of the embodiment of FIG. 3A may be used to improve the resolution of a pixelated imaging device, which may be, for example, a conventional pixelated display. The improvement in image appearance is evidenced by FIG. 5, which shows a graph of transfer functions in accordance with the one-dimensional example used above. The pixel transfer function H[x] 550 is plotted on the same axes as the transfer function 552 of the pre-compensation finite impulse response filter formed from coefficients C[m,n]. Transfer function 551 is the pre-compensated pixel transfer function that results from transforming an image input with the pre-compensation filter before feeding it to the pixelated display. The more "square-shouldered" transfer function 551 of the pre-compensated display, as compared with the rounded transfer function 550 of the display without pre-compensation, is evidence of the improved resolution brought about by the embodiment of FIG. 3A. A similar contrast may be observed by comparing the shape of the two-dimensional pixel transfer function of a display that lacks pre-compensation (FIG. 6) with the "square-shouldered" pixel transfer function of a pre-compensated display (FIG. 7).

Figure 8A:
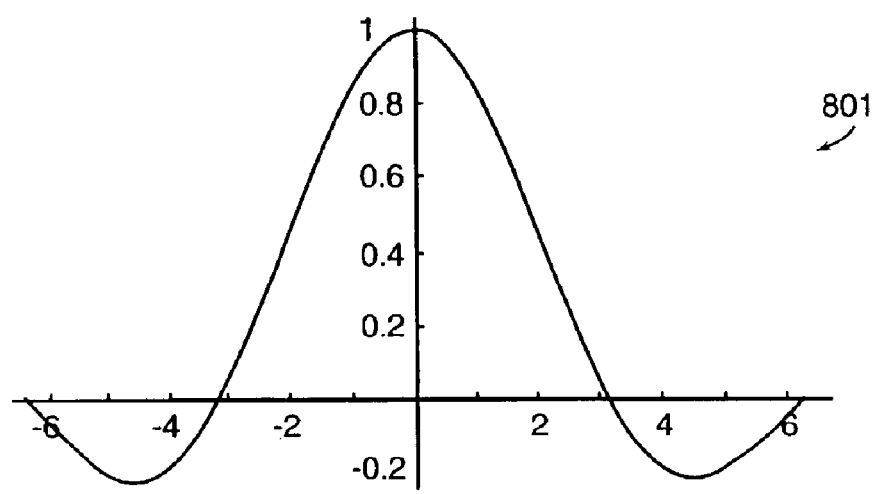
FIG. 8 shows an extended pre-compensation filter tranfer function, in accordance with an embodiment of the invention.
Figure 8B:
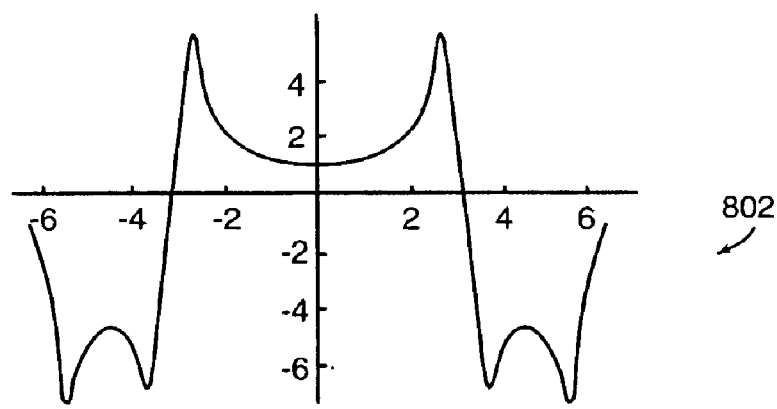
Figure 8C:
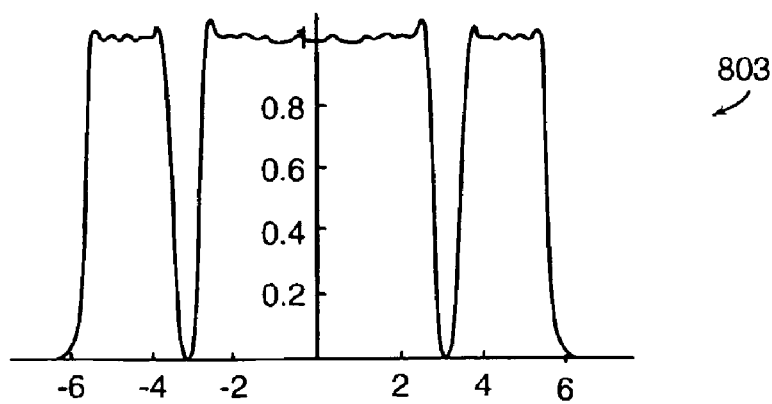

In an alternative version of the embodiment of FIG. 3A, the pre-compensation filter need not be "clipped off" within the frequency band shown above; instead, it may have an extended frequency range. FIG. 8 shows a pixel transfer function 801, an extended pre-compensation filter transfer function 802, and the "square-shouldered" transfer function 803 that results from using the pre-compensation filter 802 to filter image input.

Whereas the embodiment of FIG. 3A may be used with a single pixelated imaging device, the embodiment of FIG. 3B may be used with multiple, superposed imaging devices, such as the unaligned imaging devices of the embodiment of FIG. 1.

Steps 338–340 of FIG. 3B mirror steps 331–333 of FIG. 3A. In step 341 of FIG. 3B, however, individual coefficients of pre-compensation filters are calculated in a similar fashion to that of step 334 of FIG. 3A, but by also taking into consideration the spatial phase shift of the unaligned imagers to which the filters correspond. For example, a set of four pre-compensation filters would be used to filter inputs to the four unaligned imagers 101–104 of the embodiment of FIG. 1, with one pre-compensation filter corresponding to each one of the imagers 101–104. When calculating coefficients for the pre-compensation filter for imager 101, a phase-shift of zero would be included; but when calculating coefficients for the filter for imager 102, a diagonal phase-shift of one-quarter of a pixel would be included in the calculations; and so on. In the expression of Equation 6, for example, having the values of m and n both range from −3¾ to +4¼ could be used to calculate coefficients of a filter corresponding to a one-quarter diagonal pixel offset imager; as compared with ranges from −4 to +4 for an imager with zero diagonal offset, and −3½ to +4½ for an imager with a one-half diagonal pixel offset.

In step 342, the individual coefficients calculated in step 341 are used to calculate an entire pre-compensation finite impulse response filter, for each spatially phase-shifted pixelated imaging device. Arrow 343 indicates that individual coefficients are calculated, in step 341, until the coefficients for all pre-compensation filters are filled. For example, four filter arrays would be filled with coefficients, to create four pre-compensation filters for the unaligned imagers of the embodiment of FIG. 1.

In step 344, each pre-compensation filter is used to transform image input data for its corresponding phase-shifted pixelated imaging device. In step 345, a superposed, pre-compensation filtered image is displayed.

Figure 9:
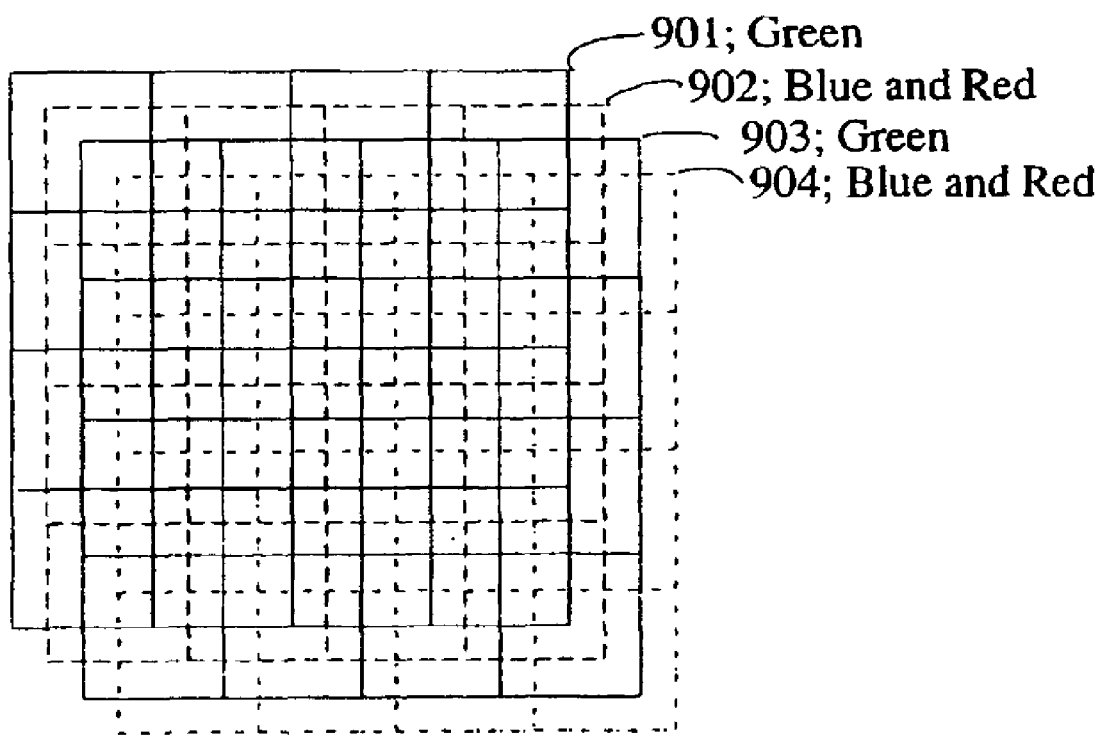
FIG. 9 shows a set of multiple unaligned imagers for optimizing image appearance to the human eye, in accordance with an embodiment of the invention.

FIG. 9 shows a method in accordance with an embodiment of the invention that optimizes image resolution by adapting the previously described methods to the human eye's optics. The eye's perception of Red and Green is ⅓ its perception of luminance, and its perception of Blue and Yellow is ⅛ its perception of luminance. Thus, high-frequency information in the luminance component of an image is more valuable than information in the chrominance components, for optimizing an image's appearance.

The embodiment of FIG. 9 uses a set of six superposed, unaligned imagers to take into account these aspects of the eye's perception. Two imagers are fed red chrominance information, two are fed green chrominance information, and two are fed blue chrominance information. Because of the eye's different weighting of different colors, the six imagers are combined into four phase families: a first, single green imager 901 has zero phase offset; a second imager 902 comprising a blue imager aligned with a red imager has a ¼ diagonal pixel offset as compared with the single green imager 901; a third imager 903 comprising a single green imager has a ½ diagonal pixel offset as compared with the single green imager 901; and a fourth imager 904 comprising a blue imager aligned with a red imager has a ¾ diagonal pixel offset as compared with the single green imager 901.

The embodiment of FIG. 9 may be operated in a similar fashion to that described in FIGS. 2B and 3B, or may be fed phase-shifted signals without pre-compensation.

In another embodiment according to the invention, a perception-based representation of the image—such as a YUV or HIS representation, for example, instead of an RGB representation—is processed by its own reconstruction filter. The output of the filter yields the appropriate perception-based pixel value for each element of each grid; this is then converted to the appropriate color value for each element of each grid.

While the embodiments described above have been discussed in terms of image projection on pixelated displays, similar methods may be used for image sensing and recording, in accordance with an embodiment of the invention.

Multiple unaligned sensors may be set up, in an analogous fashion to the multiple displays of FIG. 1; or one image may be split among multiple real or time-multiplexed imagers by beam splitters.

For color applications, each imager may operate in one color frequency band. For example, a set of six unaligned color sensors may be implemented in a similar fashion to that described for FIG. 9. As with the embodiments of FIGS. 2B and 3B, the image inputs from each sensor device may be pre-compensation filtered.

In addition, however, the separate viewpoint provided by each sensor may be considered as a single 2D-filtered view of an infinite number of possible image signals, that provides constraints on the image to be displayed. A displayed image is then calculated by determining the lowest energy signal that satisfies the constraints established by the signals from the various separate sensors. That is, the energy $$\sum_m \sum_n \text{Abs}\,[S[m,n]]\wedge 2 \qquad \text{(Eq. 7)}$$

is minimized for proposed signals S[m,n] that satisfy the boundary conditions established by sensor image signals $S_1[m,n] \ldots S_k[m,n]$, for k imagers. The proposed signal S[m,n] that provides the minimum energy value is then used as the sensed signal for display.

In another embodiment, a color camera is implemented by dividing the visible spectrum for each physical sensor using a diachroic prism. In one example, six imagers are used, with a prism dividing the image into six color frequency ranges. Information from each color frequency range is then supplied to a displaced imager. The lowest energy luminance and color difference signals are then solved. These signals satisfy the constraints generated by the six imager signals and their known 2D frequency response and phasing. In addition to the frequency response and phasing of each imager, the sagital and tangential frequency response of the optics at that light frequency may be included in calculations, to correct for the Modular Transfer Function (MTF) of the optics. The contribution of each of the six color bands is then weighted for human perception of luminance and of the Cb and Cr signals.

In another embodiment, a playback device is implemented. The playback device filters and interpolates the original signal to provide the correct transfer function and signal value at the location of each pixel on each imager. If more than one imager is used for each color component, the component image energy may be divided and weighted for perception among the imagers. If each color component is divided into separate color frequencies, the image energy may be divided among those components and weighted by perception.

Another embodiment comprises a recording device. To record the signal, there are two approaches. One is to record each imager's information as a separate component. This preserves all of the information. The other alternative is to record a combined high-frequency luminance signal and two combined color difference signals. If three to six imagers are used, good results can be obtained by recording a luminance signal with twice the resolution in both dimensions as the two color difference signals.

In a polarized light embodiment, multiple imagers are operated with two clases of polarized light. Separate eye views are supplied to imagers, so that a single projection device gives a three-dimensional appearance to the projected image.

An embodiment of the invention also provides a technique for manufacturing imagers for use with the embodiments described above. In accordance with this embodiment, if color component imagers are assembled with little concern to their precise orientation, or response, spot response sensors (for projection), or calibrated spot generators (in the case of a camera), allow inspection at the geometric extremes of the image. This inspection, combined with a hyperaccuity-based signal processing approach, determine exact placement phase, scale, rotation and tilt of each manufactured display. If tilt is not required, two sensors suffice.

In one embodiment, such sensors can be used in manufacturing to set placement parameters. In another embodiment, such sensors are used in the product to automatically optimize response for component grid placement. In this embodiment, the sensors can also be used for automatic color correction and white balance for the current environment. The process and the feedback hardware required can be generalized to compensate for manufacturing tolerance, operational, or calibration requirements. In the most general case, automatic compensation requires a full image sensor for a projector, or a reference image generator for a camera. In this case, flat field, black field, linearity, color shift, geometric distortion, and modulated transfer function can all be compensated for.

Some embodiments of the invention may be implemented, at least in part, in any conventional computer programming language comprising computer program code. For example, preferred embodiments may be implemented, at least in part, in a procedural programming language (e.g., "C") or an object oriented programming language (e.g., "C++"). Alternative embodiments of the invention may be implemented, at least in part, as preprogrammed hardware elements (e.g., application specific integrated circuits, FPGAs, and digital signal processors), or other related components.

The present invention may be embodied in other specific forms without departing from the true scope of the invention. The described embodiments are to be considered in all respects only as illustrative and not restrictive.

What is claimed is:

1. A method of processing image data for display on a pixelated imaging device having an associated Nyquist frequency, the method comprising:
   pre-compensation filtering an image input for each of a plurality of superposed pixelated imaging devices, at least two of which are unaligned, to produce multiple sets of pre-compensation filtered pixel values, the pre-compensation filtering being performed with a filter having a transfer function that approximates the function that equals one divided by a pixel transfer function, at least over a frequency range whose upper limit does not exceed the Nyquist frequency of the pixelated imaging device; and displaying the multiple pre-compensation filtered pixel values on six imaging devices, the six imaging devices being positioned in four spatial phase families, the first and third spatial phase families each corresponding to a separate imaging device, each of which is fed green chrominance values, the second and fourth spatial phase families each corresponding to a pair of aligned imaging devices, each pair having an imaging device that is fed blue chrominance values and an imaging device that is fed red chrominance values.

2. A method according to claim 1, wherein the four spatial phase families are diagonally offset from each other by one-quarter of a diagonal pixel dimension of the pixelated imaging device.

3. A method of processing image data for display on a pixelated imaging device having an associated Nyquist frequency, the method comprising:

pre-compensation filtering an image input for each of a plurality of superposed pixelated imaging devices, at least two of which are unaligned, to produce multiple sets of pre-compensation filtered pixel values, the pre-compensation filtering being performed with a filter having a transfer function that approximates the function that equals one divided by a pixel transfer function, at least over a frequency range whose upper limit does not exceed the Nyquist frequency of the pixelated imaging device;

displaying the multiple pre-compensation filtered pixel values on three imaging devices, the three imaging devices being positioned in two spatial phase families, the first spatial phase family corresponding to an imaging device that is fed green chrominance values, the second spatial phase family corresponding to an imaging device that is fed blue chrominance values and to an aligned imaging device that is fed red chrominance values.

4. A method according to claim 3, wherein the two spatial phase families are diagonally offset from each other by one-half of a diagonal pixel dimension of the pixelated imaging device.

5. A method of processing image data for display on a pixelated imaging device having an associated Nyquist frequency, the method comprising:

pre-compensation filtering an image input to produce pre-compensation filtered pixel values, the pre-compensation filtering being performed with a filter having a transfer function that equals the result of gain-limiting and clipping the function that equals one divided by a pixel transfer function, at least over a frequency range whose upper limit does not exceed the Nyquist frequency of the pixelated imaging device; and displaying the pre-compensation filtered pixel values on the pixelated imaging device;

wherein the pre-compensation filter transfer function is clipped at a frequency that exceeds the Nyquist frequency of the pixelated imaging device.

6. A method of processing image data for display on a pixelated imaging device having an associated Nyquist frequency, the method comprising:

pre-compensation filtering an image input to produce pre-compensation filtered pixel values, the pre-compensation filtering being performed with a filter having a transfer function that equals the result of gain-limiting and clipping the function that equals one divided by a pixel transfer function, at least over a frequency range whose upper limit does not exceed the Nyquist frequency of the pixelated imaging device; and pre-compensation filtering image input data that is in a perception-based format to yield a filtered perception-based pixel value for each pixel of the pixelated imaging device; and converting each filtered perception-based pixel value to a corresponding color value, for each pixel of the pixelated imaging device;

displaying the pre-compensation filtered pixel values on the pixelated imaging device.

7. A method of processing image data for display on a pixelated imaging device having an associated Nyquist frequency, the method comprising:

pre-compensation filtering an image input to produce pre-compensation filtered pixel values, the pre-compensation filtering being performed with a filter having a transfer function that approximates the function that equals one divided by a pixel transfer function, at least over a frequency range whose upper limit does not exceed the Nyquist frequency of the pixelated imaging device; and displaying in the pre-compensation filtered pixel values on the pixelated imaging device;

wherein the step of pre-compensation filtering further requires:

filtering the image input with a pre-compensation filter having a transfer function that equals the result of gain-limiting and clipping a function equal to:

$$H[u, V] = \frac{1}{\{\text{Sinc}[u] * \text{Sinc}[V]\}}$$

where a function Sin c[x] is defined as:

$$\text{Sinc}[x] = \begin{cases} 1, x = 0 \\ \frac{\sin[x]}{x}, x \neq 0 \end{cases}$$

and "*" denotes convolution, and u,V are spatial frequency variables.

8. A method of processing image data for display on a pixelated imaging device having an associated Nyquist frequency, the method comprising:

pre-compensation filtering an image input for each of a plurality of superposed pixelated imaging devices, at least two of which are unaligned, to produce pre-multiple sets of pre-compensation filtered pixel values, the pre-compensation filtering being performed with a filter having a transfer function equals the result of gain-limiting and clipping a function that equals one divided by a pixel transfer function, at least over a frequency range whose upper limit does not exceed the Nyquist frequency of the pixelated imaging device; and displaying the multiple pre-compensation filtered pixel values on the plurality of superposed pixelated imaging devices wherein pre-compensation filtering image input data that is in a perception-based format to yield a filtered perception-based pixel value for each pixel of each pixelated imaging device of the plurality of pixelated imaging devices; and converting each filtered perception-based pixel value to a corresponding color value, for each pixel of each pixelated imaging device of the plurality of superposed pixelated imaging devices.

9. A method of processing image data for display on a pixelated imaging device having an associated Nyquist frequency, the method comprising:

pre-compensation filtering an image input for each of a plurality of superposed pixelated imaging devices, at least two of which are unaligned, to produce multiple sets of pre-compensation filtered pixel values, the pre-compensation filtering being performed with a filter having a transfer function that approximates the function that equals one divided by a pixel transfer function, at least over a frequency range whose upper limit does not exceed the Nyquist frequency of the pixelated imaging device;

the pre-compensation filter having a transfer function that equals the result of gain-limiting and clipping a function equal to:

$$H[u, V] = \frac{1}{\{\operatorname{Sinc}[u] * \operatorname{Sinc}[V]\}}$$

where a function Sin c[x] is defined as:

$$\operatorname{Sinc}[x] = \begin{cases} 1, x = 0 \\ \frac{\sin[x]}{x}, x \neq 0 \end{cases}$$

and "k" denotes convolution, and u,V are spatial frequency variables.

10. A method of displaying an image, the method comprising:

processing an image input data set to produce pixel values for display on a plurality of superposed pixelated imaging devices, at least two of which are unaligned; and displaying the pixel values on six imaging devices, the six imaging devices being positioned in four spatial phase families, the first and third spatial phase families each corresponding to a separate imaging device, each of which is fed green chrominance values, the second and fourth spatial phase families each corresponding to a pair of aligned imaging devices, each pair having an imaging device that is fed blue chrominance values and an imaging device that is fed red chrominance values.

11. A method according to claim 10, wherein the four spatial phase families are diagonally offset from each other by one-quarter of a diagonal pixel dimension of the pixelated imaging device.

12. A method according to claim 10, the method further comprising:

displaying the pixel values on three imaging devices, the three imaging devices being positioned in two spatial phase families, the first spatial phase family corresponding to an imaging device that is fed green chrominance values, the second spatial phase family corresponding to an imaging device that is fed blue chrominance values and to an aligned imaging device that is fed red chrominance values.

13. A method according to claim 12, wherein the two spatial phase families are diagonally offset from each other by one-half of a diagonal pixel dimension of the pixelated imaging device.

14. A method according to claim 10, wherein the method further comprises:

unaligning at least two of the superposed pixelated imaging devices by spatially phase-shifting the at least two imaging devices with respect to each other in two spatial dimensions.

15. A method according to claim 14, wherein the step of unaligning the at least two imaging devices comprises:

spatially phase-shifting at least two arrays of square pixels with respect to each other, the spatial phase-shift having equal horizontal and vertical components.

16. A method according to claim 14, wherein the step of unaligning the at least two imaging devices comprises:

spatially phase-shifting at least two arrays of rectangular pixels with respect to each other, the spatial phase-shift having horizontal and vertical components of differing magnitudes.

17. A method according to claim 14, wherein the method further comprises:

spatially aligning at least two imaging devices of the superposed pixelated imaging devices.

18. A method according to claim 10, wherein the method further comprises:

unaligning at least two of the superposed pixelated imaging devices with respect to each other, by using imaging devices having differing properties chosen from the group consisting of: optical properties, physical properties, scale, rotational angle, aspect ratio, and relative liner offset.

* * * * *